(12) United States Patent
Sumida et al.

(10) Patent No.: US 7,960,937 B2
(45) Date of Patent: Jun. 14, 2011

(54) INVERTER UNIT, INTEGRATED CIRCUIT CHIP, AND VEHICLE DRIVE APPARATUS

(75) Inventors: Hitoshi Sumida, Matsumoto (JP); Akinobu Teramoto, Sendai (JP); Ken-ichi Nonaka, Saitama (JP); Toshio Naka, Osaka (JP)

(73) Assignees: Fuji Electric Systems Co., Ltd., Tokyo (JP); Sharp Kabushiki Kaisha, Osaka (JP); Honda Motor Co., Ltd., Tokyo (JP)

( * ) Notice: Subject to any disclaimer, the term of this patent is extended or adjusted under 35 U.S.C. 154(b) by 1520 days.

(21) Appl. No.: 11/219,796

(22) Filed: Sep. 7, 2005

(65) Prior Publication Data

US 2006/0050455 A1 Mar. 9, 2006

(30) Foreign Application Priority Data

Sep. 8, 2004 (JP) ................................ 2004-260366

(51) Int. Cl.
*H02P 27/04* (2006.01)
(52) U.S. Cl. ........................... 318/801; 361/56; 361/600
(58) Field of Classification Search .................. 318/801; 361/56, 600
See application file for complete search history.

(56) References Cited

U.S. PATENT DOCUMENTS

| 5,107,151 | A | * | 4/1992 | Cambier | ........................ | 327/432 |
| 5,852,538 | A | * | 12/1998 | Masui | .............................. | 361/18 |
| 2004/0100750 | A1 | | 5/2004 | Shigeta et al. | | |
| 2007/0008679 | A1* | | 1/2007 | Takahasi et al. | .............. | 361/600 |

FOREIGN PATENT DOCUMENTS

| JP | 5-316755 | 11/1993 |
| JP | 6-196630 | 7/1994 |
| JP | 2000-22166 | 1/2000 |
| JP | 2001-25235 | 1/2001 |
| JP | 2003-189632 | 7/2003 |
| JP | 2004-120917 | 4/2004 |
| JP | 2004-173413 | 6/2004 |
| WO | WO 2004/073065 | 8/2004 |

OTHER PUBLICATIONS

"A New Generation Hybrid Electric Vehicle and Its Supporting Power Semiconductor Devices", by Akira Kawahashi, pp. 23-29, Proceedings of the 16th International Symposium on Power Semiconductor Devices & IC's, May 24-27, 2004.

(Continued)

*Primary Examiner* — Walter Benson
*Assistant Examiner* — Erick Glass
(74) *Attorney, Agent, or Firm* — Staas & Halsey LLP

(57) ABSTRACT

A miniaturizable, low-cost highly reliable inverter unit. A control circuit section for controlling operating timing of high breakdown voltage semiconductor elements included in an inverter circuit section and first and second drive and abnormality detection circuit sections for outputting drive signals for driving the high breakdown voltage semiconductor elements according to the operating timing and for feeding back an abnormality of the inverter circuit section to the control circuit section are formed on an SOI substrate as one integrated circuit chip. On the integrated circuit chip, circuit formation areas which differ in reference potential are separated from one another by dielectrics. A plurality of level shifters for transmitting signals exchanged between circuit formation areas separated by the dielectrics are formed.

9 Claims, 8 Drawing Sheets

OTHER PUBLICATIONS

"IPM's Solving Major Reliability Issues in Automotive Applications," Hussein et al., pp. 89-92, Proceedings of the 16$^{th}$ International Symposium on Power Semiconductor Devices & IC's, May 24-27, 2004.

"A 600V HVIC Process with a built-in EPROM which enables new concept Gate Driving", pp. 379-382, Proceedings of the 16$^{th}$ International Symposium on Power Semiconductor Devices & IC's, May 24-27, 2004.

Mitsubishi Electric Corporation, Technical Reports, vol. 74, No. 9, 2000, pp. 31-34.

Patent Abstract of Japan, Publication No. 5-316755, Publication Date Nov. 26, 1993 (Gazette and Partial Translation of 5-316755 submitted on Oct. 31, 2005).

Patent Abstract of Japan, Publication No. 2001-25235, Publication Date Jan. 26, 2001.

Patent Abstract of Japan, Publication No. 2000-22166, Publication Date Jan. 21, 2000.

Patent Abstract of Japan, Publication No. 6-196630, Publication Date Jul. 15, 1994.

Japanese Office Action issued on Mar. 30, 2010 in corresponding Japanese Patent Application 2004-260366.

Partial English Translation of Japanese Office Action issued on Mar. 30, 2010 in corresponding Japanese Patent Application 2004-260366.

Japanese Office Action issued on Aug. 3, 2010 in corresponding Japanese Patent Application 2004-260366.

\* cited by examiner

US 7,960,937 B2

INVERTER UNIT, INTEGRATED CIRCUIT CHIP, AND VEHICLE DRIVE APPARATUS

CROSS-REFERENCE TO RELATED APPLICATIONS

This application is based upon and claims the benefits of priority from the prior Japanese Patent Application No. 2004-260366, filed on Sep. 8, 2004, the entire contents of which are incorporated herein by reference.

BACKGROUND OF THE INVENTION (1) Field of the Invention

This invention relates to an inverter unit, an integrated circuit chip, and a vehicle drive apparatus and, more particularly, to an inverter unit for controlling an AC motor, an integrated circuit chip for driving an inverter circuit including a plurality of high breakdown voltage semiconductor elements, and a vehicle drive apparatus for driving vehicular tires by an AC motor.

(2) Description of the Related Art

In recent years attention has been riveted on environmental problems, such as emissions of carbonic acid gas which cause global warming and air pollution. Hybrid electric vehicles (HEVs) in which a conventional internal combustion engine and electric drive by a motor are combined have occupied attention because they can not only reduce harmful substances included in their emissions but also improve fuel efficiency.

One of key parts included in an HEV is an inverter unit which enables the electrification of a drive system.

FIG. 7 shows an inverter unit used in a conventional HEV.

An inverter unit 800 for conventional HEVs comprises a microcontroller unit (MCU) 810, a pre-drive unit (PDU) 820, a protection and insulation circuit 830, a three-phase inverter circuit 840, and a smoothing capacitor 850 (see, for example, Mitsubishi Electric Corp. Technical Reports, vol. 74, No. 9, 2000, pp. 31-34 (FIG. 4)).

The MCU 810 receives a motion control signal (not shown) for the HEV or a signal from a sensor 901 which detects the number of revolutions and the like of an AC motor 900, and outputs an inverter control signal to the PDU 820.

The PDU 820 is a circuit section for driving and controlling the three-phase inverter circuit 840. The PDU 820 receives the signal from the MCU 810 and operates.

The protection and insulation circuit 830 protects the PDU 820 and the three-phase inverter circuit 840 and insulates them. The protection and insulation circuit 830 includes a sensor for detecting an abnormality. The protection and insulation circuit 830 prevents noise which occurs due to, for example, the malfunction of the three-phase inverter circuit 840 from flowing into the PDU 820.

The three-phase inverter circuit 840 includes six insulated gate bipolar transistors (IGBTs) 841 and six fly wheel diodes (FwDis) 842. Each IGBT 841 and each FwDi 842 are connected in parallel. Three combinations of two IGBTs 841 and two FwDis 842 form the three-phase inverter circuit 840. The breakdown voltages of the IGBTs 841 and the FwDis 842 are 600V, so they can withstand a battery voltage of 350V supplied by power supply 902.

In the inverter unit 800 having the above structure, the three-phase inverter circuit 840 controls the three-phase AC motor 900 which drives vehicular tires (not shown). One three-phase AC motor 900 is mounted in one vehicle and is fixed to a shaft which connects two tires.

FIG. 8 shows the detailed structure of the PDU included in the inverter unit used in the conventional HEV. This circuit is indicated in, for example, the above-mentioned Mitsubishi Electric Corp. Technical Report.

The PDU 820 is a circuit section for controlling the switching of the IGBTs 841 included in the inverter circuit 840. Basically, the PDU 820 is divided into a circuit section for controlling operating timing of the IGBTs 841 and circuit sections for outputting a drive signal for driving the IGBT 841 according to the timing. A central processing unit (CPU) 821, being an IC, corresponds to the circuit section for controlling the operating timing of the IGBTs 841. Very large scale integrated circuits (VLSIs) 822 correspond to the circuit sections for outputting a drive signal (herein after also referred to as a gate signal) to the IGBT 841. One of these circuit sections is necessary to each IGBT 841.

The PDU 820 also includes photocouplers (indicated by "Isolation-IC" in FIG. 8) 823-1 through 823-11 for transmitting signals between the circuit sections or for ensuring safe operation by preventing noise from being mixed into a signal inputted from or outputted to the MCU 810, a low-pass filter 824 for cutting off high frequency components of a signal inputted from the MCU 810, a converter 825 for converting a signal outputted from the CPU 821 into a DC signal and for outputting it to the MCU 810, a DC/DC converter 826, and buffers 827 each located between the VLSI 822 and the IGBT 841 as discrete components which are not incorporated into an IC.

Only circuits for driving one phase of the inverter are shown in FIG. 8, but circuits for driving and controlling the three phases of the inverter are included in the real PDU 820.

When an abnormality occurred in the IGBT 841, the operation of the inverter circuit 840 must be stopped. Accordingly, temperature detection results obtained by temperature sensors 831 and electric current detection results obtained by current sensors 832 are fed back to the PDU 820 to control the outputting of drive signals. This circuit function corresponds to the protection and insulation circuit 830 shown in FIG. 7. The operating timing of the IGBTs 841 is controlled by a signal outputted from the MCU 810. An electric current detection result, a rotational speed detection result, and a temperature detection result obtained from the AC motor 900 by a current sensor 901a, a rotational speed sensor 901b, and a temperature sensor 901c, respectively, are fed back to the MCU 810.

Characteristics of the above conventional PDU are (1) that it is a hybrid IC including the ICs and the discrete components, (2) that the control circuit section for controlling the timing of the IGBTs 841 and the circuit sections for outputting a gate signal to each IGBT 841 differ from one another in reference potential, that is to say, there are five or more reference potentials, and (3) that signals are transmitted between the circuit sections via the photocouplers and signals are inputted from or outputted to the outside via the photocouplers.

With the inverter unit to be mounted in a vehicle, protection against noise is important. It is necessary to prevent noise produced by the switching of the inverter circuit from flowing into the PDU or the MCU. Therefore, the above characteristics (2) and (3) are necessary to the PDU.

To promote the spread of the HEV system, at present there are strong demands for compact, light, low-cost high performance inverter units for use in HEVs. In addition, high reliability and high cooling performance are required.

However, conventional PDUs are hybrid ICs. One hybrid IC includes various ICs and elements are necessary for protecting these ICs. Therefore, a large number of parts are used in one PDU. This increases the area of a PDU section, resulting in the difficulty of miniaturizing an inverter unit or making it lighter.

In addition, with conventional PDUs, signals are transmitted between circuit sections via photocouplers and signals are inputted from or outputted to the outside via photocouplers. However, there liability of these photocouplers is low at high temperatures. To ensure the reliability of conventional PDUs at high temperatures, cooling systems are necessary. This is also a barrier to miniaturization. Furthermore, about fifteen photocouplers are used in one conventional PDU, resulting in the high costs of an inverter unit.

To solve these problems, a method for realizing miniaturization by forming a PDU as an integrated circuit is disclosed (see, for example, Japanese Unexamined Patent Publication No. 2004-120917 or No. Hei 5-316755 (FIG. 6)).

Furthermore, an interface circuit which is included in an IGBT control unit for driving a motor and which replaces the photocouplers is disclosed as a technique for eliminating the photocouplers (see, for example, Japanese Unexamined Patent Publication No. 2004-173413).

With the PDU disclosed in, for example, the Japanese Unexamined Patent Publication No. 2004-120917, however, a circuit section for driving and controlling IGBTs for driving a motor is formed as multiple chips. Accordingly, there is a limit to the miniaturization of the PDU.

In the Japanese Unexamined Patent Publication No. Hei 5-316755, a power supply is shared by a circuit section for outputting gate signals to IGBT son the lower armside (low voltage arm side) and a circuit section for controlling the operating timing of the IGBTs. Accordingly, this method cannot prevent noise from flowing into the PDU via a power supply system. The reliability of a PDU made by this method deteriorates.

In the Japanese Unexamined Patent Publication No. 2004-173413, the interface circuit which replaces the photocouplers is disclosed, but integration of a PDU or making reference potentials independent of one another is not disclosed.

SUMMARY OF THE INVENTION

The present invention was made under the background circumstances described above. An object of the present invention is to provide a miniaturizable, low-cost highly reliable inverter unit.

Another object of the present invention is provide a low-cost highly reliable integrated circuit chip for driving an inverter circuit used in such an inverter unit.

Still another object of the present invention is provide a miniaturizable, low-cost highly reliable vehicle drive apparatus for driving vehicular tires by an AC motor.

In order to achieve the above first object, an inverter unit for controlling an AC motor is provided. This inverter unit comprises an inverter circuit section including a plurality of high breakdown voltage semiconductor elements; and an integrated circuit chip including a first circuit section for controlling operating timing of the plurality of high breakdown voltage semiconductor elements and a second circuit section for outputting drive signals for driving the plurality of high breakdown voltage semiconductor elements according to the operating timing and for feeding back an abnormality of the inverter circuit section to the first circuit section formed on an SOI substrate.

In order to achieve the above second object, an integrated circuit chip for driving an inverter circuit including a plurality of high breakdown voltage semiconductor elements is provided. This integrated circuit chip comprises a first circuit section for controlling operating timing of the plurality of high breakdown voltage semiconductor elements; and a second circuit section for outputting drive signals for driving the plurality of high breakdown voltage semiconductor elements according to the operating timing and for feeding back an abnormality of the inverter circuit to the first circuit section, wherein the first circuit section and the second circuit section are formed on an SOI substrate.

In order to achieve the above third object, a vehicle drive apparatus for driving vehicular tires by an AC motor. This vehicle drive apparatus comprises an inverter unit for controlling the AC motor, the inverter unit including an inverter circuit section including a plurality of high breakdown voltage semiconductor elements and an integrated circuit chip including a first circuit section for controlling operating timing of the plurality of high breakdown voltage semiconductor elements and a second circuit section for outputting drive signals for driving the plurality of high breakdown voltage semiconductor elements according to the operating timing and for feeding back an abnormality of the inverter circuit section to the first circuit section formed on an SOI substrate.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will now be described in detail with reference to the drawings.

Figure 1:
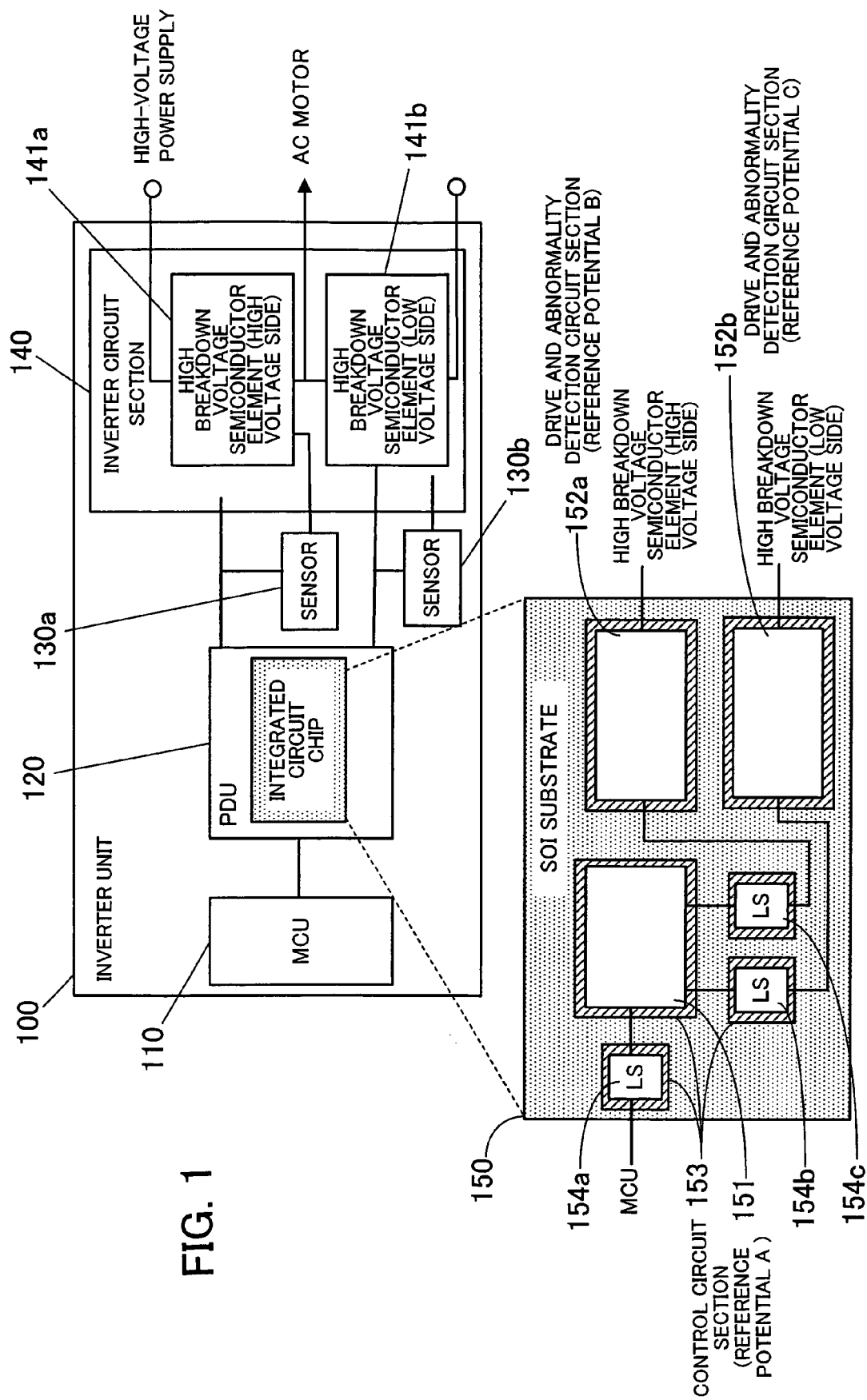
FIG. 1 shows the rough structure of an inverter unit.

FIG. 1 shows the rough structure of an inverter unit.

An inverter unit 100 comprises an MCU 110, a PDU 120, sensors 130a and 130b, and an inverter circuit section 140.

The MCU 110 receives an HEV motion control signal and a revolution signal sent from a sensor for detecting AC motor (not shown) revolutions and outputs an inverter control signal to the PDU 120.

The PDU 120 is a circuit section for driving and controlling the inverter circuit section 140 and a large part of its function is integrated onto one integrated circuit chip 150.

That is to say, the integrated circuit chip 150 includes a control circuit section 151 for controlling operating timing of high breakdown voltage semiconductor elements 141a and 141b and drive and abnormality detection circuit sections 152a and 152b for outputting drive signals for driving the high breakdown voltage semiconductor elements according to the operating timing and for feeding back an abnormality of the inverter circuit section 140 to the control circuit section 151. The control circuit section 151 and the drive and abnormality detection circuit sections 152a and 152b are formed on an SOI substrate. An oxide film for insulation can be formed vertically on the SOI substrate. Therefore, the area of elements can be made small and the above circuit sections can easily be integrated.

In addition, on the integrated circuit chip 150 circuit formation areas which differ in reference potential are separated from one another by dielectrics 153 such as silicon oxide films. In FIG. 1, for example, circuit formation areas where the control circuit section 151 having reference potential A, the drive and abnormality detection circuit section 152a having reference potential B, and the drive and abnormality detection circuit section 152b having reference potential C are separated from one another by the dielectrics 153. The reference potential of each of the circuit formation areas separated from one another is directly supplied by a wiring from a pad or a terminal (not shown) for supplying reference potential. Wirings for supplying reference potential are not shared by a plurality of circuit formation areas and are independent of one another. These dielectrics 153 are formed so that they will not be touching one another.

The integrated circuit chip 150 includes level shifters 154a, 154b, and 154c for transmitting signals between the circuit formation areas separated by the dielectrics 153. The level shifters 154a, 154b, and 154c are used in place of photocouplers used in conventional PDUs. If the level shifters 154a, 154b, and 154c differ in reference potential, then they are also separated from one another by dielectrics 153.

The sensors 130a and 130b detect the temperature of and overcurrent in the high breakdown voltage semiconductor element 141a on the high voltage side and the high breakdown voltage semiconductor element 141b on the low voltage side, respectively, in the inverter circuit section 140 in order to protect them. When the sensor 130a or 130b detects an abnormality which occurs due to, for example, the malfunction of the inverter circuit section 140, the sensor 130a or 130b sends an abnormality signal to the PDU 120.

The inverter circuit section 140 includes the high breakdown voltage semiconductor elements 141a and 141b. The high breakdown voltage semiconductor element 141a on the high voltage side and the high breakdown voltage semiconductor element 141b on the low voltage side are connected in series with a high-voltage power supply. By using the drive signals outputted from the PDU 120, one of the high breakdown voltage semiconductor element 141a on the high voltage side and the high breakdown voltage semiconductor element 141b on the low voltage side is turned on and the other is turned off. As a result, an AC signal is generated between the high breakdown voltage semiconductor elements 141a and 141b. The AC motor (not shown) is driven by voltage obtained in this way. The high breakdown voltage semiconductor elements 141a and 141b correspond to one phase of an inverter. The inverter circuit section 140 actually includes six high breakdown voltage semiconductor elements corresponding to the three phases of the inverter. IGBTs, high breakdown voltage power metal oxide semiconductor field effect transistors (MOSFETs), or the like are used as the high breakdown voltage semiconductor elements. The inverter circuit section 140 also includes fly wheel diodes (FwDis) (not shown) connected in parallel with the high breakdown voltage semiconductor elements 141a and 141b respectively.

The operation of the inverter unit 100 will now be described in brief.

The MCU 110 receives the HEV motion control signal sent from the outside and the revolution signal sent from the sensor (not shown) for detecting AC motor (not shown) revolutions and outputs the inverter control signal to the PDU 120. The inverter control signal is inputted to the control circuit section 151 on the integrated circuit chip 150 in the PDU 120 via the level shifter 154a. On the basis of the inverter control signal inputted, the control circuit section 151 generates control signals for controlling the operating timing of the high breakdown voltage semiconductor elements 141a and 141b and sends them to the drive and abnormality detection circuit sections 152a and 152b via the level shifters 154b and 154c respectively. The drive and abnormality detection circuit sections 152a and 152b receive the control signals, generate the drive signals, drive the high breakdown voltage semiconductor elements 141a and 141b, respectively, and generate the AC signal. The AC motor (not shown) is driven by voltage obtained in this way.

In the inverter unit 100, the control circuit section 151 for controlling the operating timing of the high breakdown voltage semiconductor elements 141a and 141b and the drive and abnormality detection circuit sections 152a and 152b for outputting the drive signals for driving the high breakdown voltage semiconductor elements according to the operating timing and for feeding back an abnormality of the inverter circuit section 140 to the control circuit section 151 are formed on the SOI substrate as the one integrated circuit chip 150. This reduces the number of parts used in the inverter unit 100 and the inverter unit 100 is miniaturized. Moreover, by using the SOI substrate, the characteristics of the PDU 120 at high temperatures are improved.

In addition, on the integrated circuit chip 150, the reference potentials of the circuit formation areas separated from one another by the dielectrics 153 can be made independent of one another. A circuit block corresponding to a required function can be formed in a circuit formation area separated from the other circuit formation areas by the dielectrics 153. Therefore, a circuit block corresponding to a required function can be formed on the chip. This improves the function of the chip.

The reference potential of each of the circuit formation areas separated from one another is directly supplied by a wiring from a pad or a terminal (not shown) for supplying reference potential. Wirings for supplying voltage are not shared by a plurality of circuit formation areas and are independent of one another. Accordingly, variations in reference potential can be restricted within a circuit formation area.

In addition, the level shifters 154a, 154b, and 154c are used for transmitting signals between the circuit formation areas. This prevents noise produced in a circuit formation area from flowing into adjacent circuit formation areas. Moreover, photocouplers are not used, so it is expected that the low-cost, easily cooled highly reliable integrated circuit chip 150 will be realized.

By incorporating the inverter circuit section 140 and the integrated circuit chip 150 within one module, the inverter unit 100 can be miniaturized further.

The PDU used in the inverter unit will now be described in detail.

Figure 2:
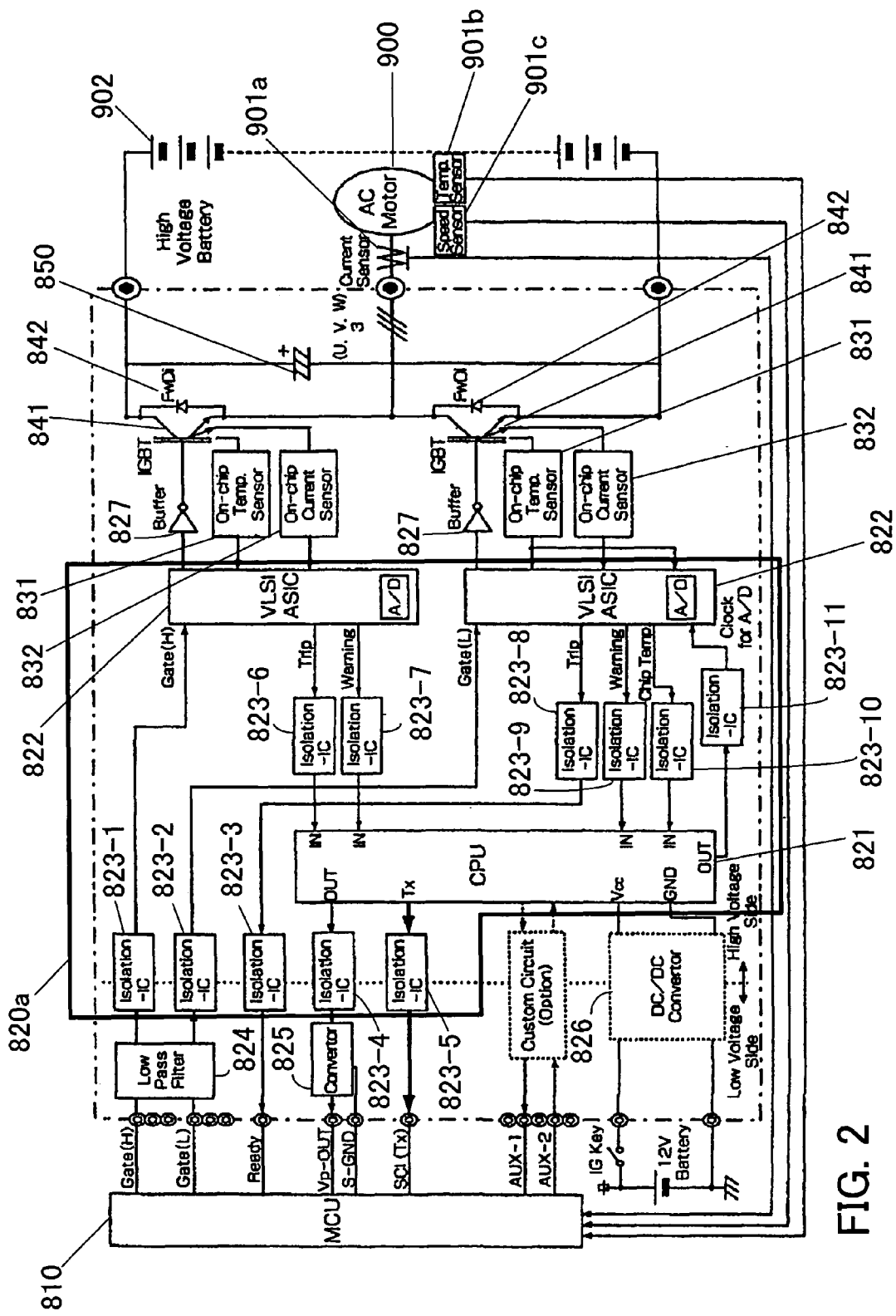
FIG. 2 shows an area in the inverter unit to be integrated onto one chip.

FIG. 2 shows an area in the inverter unit to be integrated onto one chip.

Figure 8:
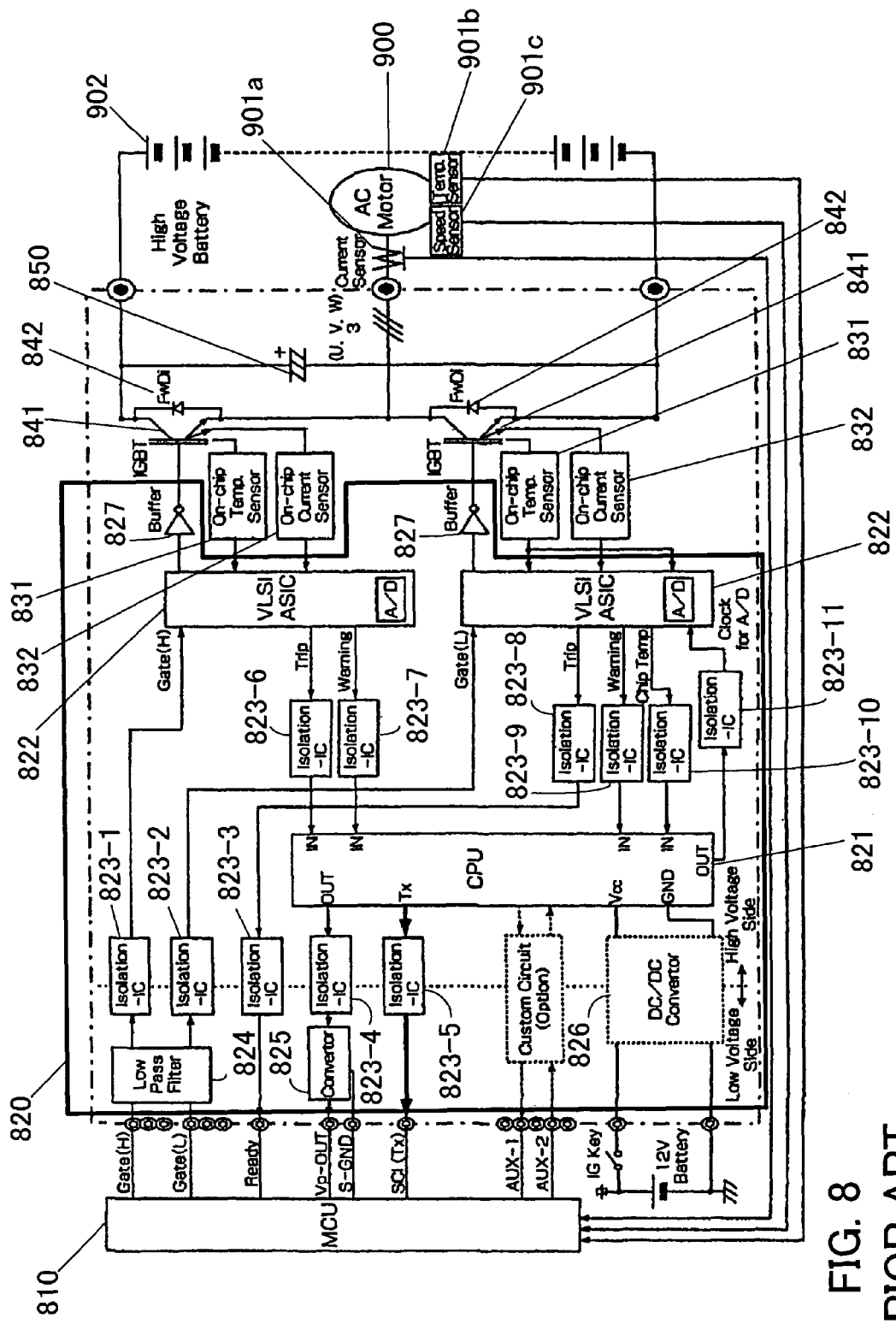
FIG. 8 shows the detailed structure of the PDU included in the inverter unit used in the conventional HEV.

In this example, an area to be integrated in an embodiment of the present invention is indicated by using the PDU in the conventional inverter unit shown in FIG. 8.

In the embodiment of the present invention, a circuit section 820a in the conventional PDU is an area to be integrated. The buffers 827 for driving gates of the IGBTs 841 are required for the three phases and each buffer 827 must be able to carry a current of 1.0 A or more. Accordingly, it is advantageous in the cost aspect to use discrete components as the buffers 827. That is to say, the buffers 827 are not integrated onto the one chip. In addition, the low-pass filter 824, the converter 825, and the DC/DC converter 826, etc. are not integrated onto the one chip.

The circuit section 820a includes a 5V power supply for driving the CPU 821, a 15V power supply for the circuit sections, or the VLSIs 822, for outputting drive signals to the IGBTs 841, and a 350V high-voltage power supply (hereinafter also indicated by VH) for driving the AC motor 900 as power supply systems.

If the above is taken into consideration, circuit unit groups to be integrated in this embodiment are as follows.

Figure 3:
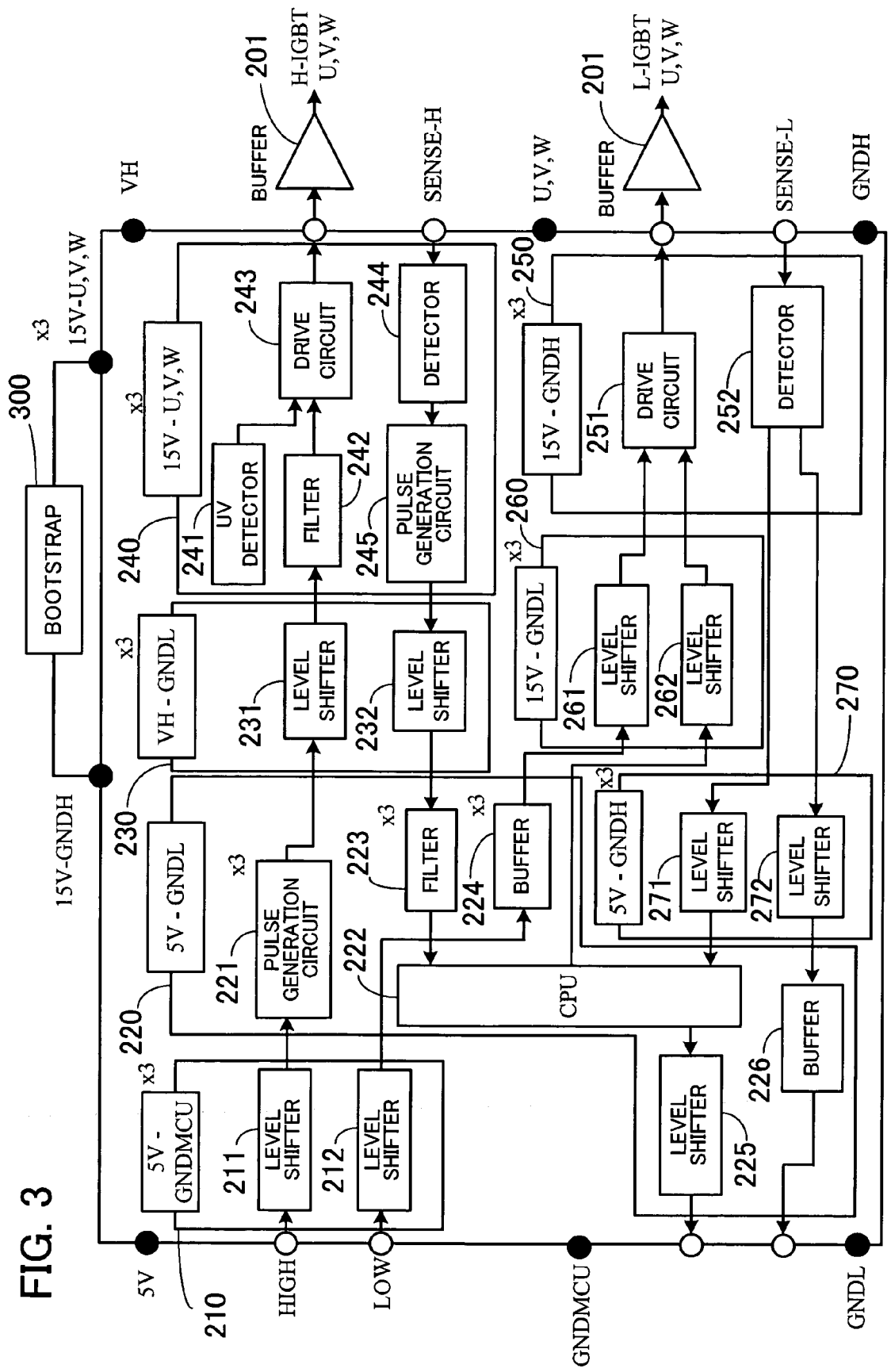
FIG. 3 shows circuit unit groups to be integrated in an embodiment of the present invention and power supplies therefor.

FIG. 3 shows circuit unit groups to be integrated in this embodiment and power supplies therefor.

In FIG. 3, power supply terminals and external input-output terminals are shown on an outer frame. GNDL, GND-MCU, and GNDH in FIG. 3 indicate reference potential or terminals via which it is supplied. Each "x3" in FIG. 3 indicates that components are required for the three phases of the inverter.

In FIG. 3, circuit unit groups to be integrated are classified into circuit sections 210, 220, 230, 240, 250, 260, and 270 according to power supplies.

The circuit section 210 corresponds to the level shifter 154a shown in FIG. 1. The circuit section 210 includes level shifters 211 and 212 used in place of the conventional photocouplers 823-1 and 823-2 respectively (see FIG. 2 or 8). The circuit section 210 has the function of transmitting inverter control signals inputted from the MCU (not shown) via HIGH and LOW terminals to the circuit section 220. The circuit section 210 is driven at 5V with respect to GNDMCU, being the reference potential of the MCU. In this embodiment, the signal sent from the MCU is inputted to a level shifter 261 in the circuit section 260 via the level shifter 212 in the circuit section 210 and a buffer 224 in the circuit section 220 in order to temporarily convert the signal with GNDMCU as reference potential into a signal with GNDL as reference potential. The reason for this is to securely prevent noise from flowing into the MCU via the ground.

The circuit section 220 corresponds to the control circuit section 151 shown in FIG. 1 and is the main section of a control circuit system. Signals inputted to or outputted from the MCU flow through the circuit section 220. The circuit section 220 includes a pulse generation circuit 221 for converting the signal inputted from the MCU via the level shifter 211 into a one-shot pulse with GNDL as reference potential, a CPU 222, a filter 223 for controlling pulse width, buffers 224 and 226, and a level shifter 225. The circuit section 220 is driven at 5V with respect to the reference potential GNDL. The level shifter 225 inputs a signal sent from the CPU 222 to the MCU. The level shifter 225 corresponds to the two photocouplers 823-4 and 823-5 shown in FIG. 2 or 8, but in this embodiment these photocouplers are represented by the level shifter 225.

The buffer 226 is used for transmitting a signal sent from the circuit section 250 to the MCU. This signal is sent via a level shifter 272 in the circuit section 270, is converted into a signal with GNDL as reference potential, and is inputted to the MCU. The reason for this is to securely prevent noise from flowing into the MCU via the ground.

The circuit section 230 corresponds to the level shifter 154c shown in FIG. 1. The circuit section 230 includes level shifters 231 and 232 and converts signals exchanged between the circuit section 220 with GNDL as reference potential and the circuit section 240 with potential at middle points (U, V, W) in the inverter circuit as reference potential. The photocouplers 823-6 and 823-7 are used in the conventional PDU shown in FIG. 2 or 8, but in this embodiment the level shifters 231 and 232, being semiconductor devices, are used in place of the photocouplers 823-6 and 823-7 for integrating the PDU onto the chip. The level shifter 231 is used for transmitting a signal sent from the MCU to the circuit section 220 to the circuit section 240. A photo coupler corresponding to the level shifter 231 does not exist in FIG. 2 or 8. The level shifter 232 is used for transmitting an abnormality signal sent via a pulse generation circuit 245 in the circuit section 240 to the CPU 222.

A signal is not directly inputted from the MCU to the level shifter 231. That is to say, as shown in FIG. 3, this signal is temporarily converted into a one-shot pulse with GNDL as reference potential by the pulse generation circuit 221 in the circuit section 220 and is then inputted to the level shifter 231. The reason for converting this signal into a one-shot pulse is to reduce power consumed by the level shifter 231. The reason for converting the reference potential into GNDL is to securely prevent noise from flowing into the MCU via the ground. A photocoupler corresponding to the level shifter 231 does not exist in FIG. 8. A signal sent from the level shifter 232 is pulse-width-controlled by the filter 223 in the circuit section 220 and is then inputted to the CPU 222.

Voltage VH is applied to the circuit section 230 with respect to GNDL which is the reference potential of the circuit section 220. Accordingly, it is necessary to use high breakdown voltage devices as the level shifters 231 and 232 included in the circuit section 230. In this case, a horizontal n-channel device should be used as the level shifter 231 and a horizontal p-channel device should be used as the level shifter 232. Usually an n-channel MOSFET and a p-channel MOSFET are used as the level shifters 231 and 232 respectively (see FIG. 5 described later). A p-channel device is used as the level shifter 232, so its reference potential is VH.

The circuit section 240 corresponds to the drive and abnormality detection circuit section 152a shown in FIG. 1. The circuit section 240 not only drives an IGBT on the high voltage side but also detects an abnormality signal sent via a SENSE-H terminal. The circuit section 240 corresponds to the VLSI 822 connected to the IGBT 841 on the high voltage side shown in FIG. 2. A UV detector 241 is a circuit for preventing a drop in voltage. A filter 242 is a circuit for controlling the pulse width of a signal outputted from the level shifter 231. A drive circuit 243 outputs a gate signal to the IGBT on the high voltage side via a buffer 201. A detector 244 detects the abnormality signal sent via the SENSE-H terminal. The pulse generation circuit 245 is a circuit for converting a signal outputted from the detector 244 into a one-shot pulse. The circuit section 240 is driven at 15V with respect to potential at the middle points (U, V, W) in the inverter circuit.

The circuit section 250 corresponds to the drive and abnormality detection circuit section 152b shown in FIG. 1. The circuit section 250 not only drives an IGBT on the low voltage side but also detects an abnormality signal sent via a SENSE-L terminal. The circuit section 250 corresponds to the VLSI 822 connected to the IGBT 841 on the low voltage side shown in FIG. 2. The circuit section 250 includes a drive circuit 251 and a detector 252. The drive circuit 251 outputs a gate signal to the IGBT on the low voltage side via a buffer 201. The detector 252 detects the abnormality signal sent via the SENSE-L terminal and outputs it to the CPU 222 and the MCU. The circuit section 250 is driven at 15V with respect to GNDH, being the reference potential of the inverter circuit.

The circuit section 260 includes the level shifter 261 for transmitting the signal sent from the MCU 110 shown in FIG. 1 to the circuit section 250 and a level shifter 262 for transmitting a signal sent from the CPU 222 to the circuit section 250. The photocoupler 823-11 is used here in the conventional PDU. In this embodiment, however, the level shifters 261 and 262 are used in place of the photocoupler 823-11 and are integrated onto the one chip. By doing so, the PDU can be miniaturized. Even if the circuit section 260 is removed, integration can be performed. In this embodiment, however, the level shifters 261 and 262 are used for cutting off noise. The circuit section 260 is driven at 15V with respect to GNDL, being the reference potential of the circuit section 220.

The circuit section 270 includes a level shifter 271 for transmitting an abnormality signal indicative of an abnormality of the IGBT on the low voltage side detected by the circuit section 250 to the CPU 222 and the level shifter 272 for transmitting the abnormality signal to the MCU 110. The circuit section 270 is driven at 5V with respect to GNDH. However, 15V is applied as gate signals to devices used as the level shifters 271 and 272, so these devices must be guaranteed to operate at 15V. In FIG. 8, the two photocouplers 823-9 and 823-10 are used for transmitting signals to the CPU 821. In FIG. 3, however, only the level shifter 271 is used.

The circuit sections 260 and 270 correspond to the level shifter 154b shown in FIG. 1, but they use different power supplies. Therefore, the two circuit sections 260 and 270 exist.

A bootstrap 300 is a circuit section for supplying a voltage of 15 volts with respect to potential at the middle points (U, V, W) in the inverter circuit and is a circuit externally fixed.

In FIG. 3, as stated above, four 15V power supplies, one 5 v power supply, and one high-voltage power supply VH are required. In addition, GNDL, GNDMCU, GNDH, and potential at the middle points (U, V, W) in the inverter circuit exist as reference potential, being the ground of these power supplies.

The circuit unit structure shown in FIG. 3 is an example and depends on a function required of the PDU.

Figure 4:
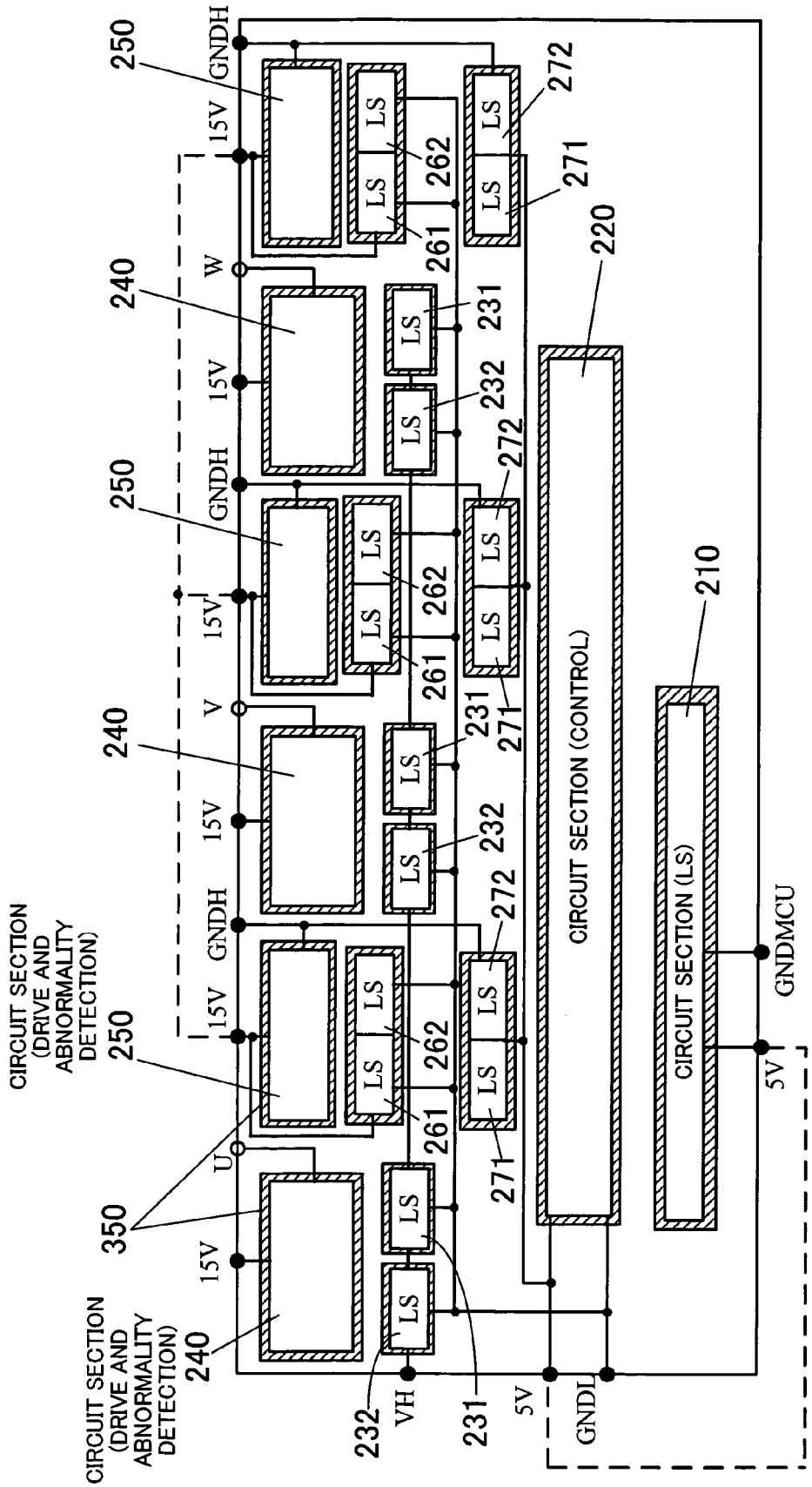
FIG. 4 is a layout plan showing how the circuits shown in FIG. 3 are integrated onto an SOI substrate.

FIG. 4 is a layout plan showing how the circuits shown in FIG. 3 are integrated onto an SOI substrate.

In FIG. 4, the circuits are formed with the three phases of the inverter circuit taken into consideration and symbols with which the circuit sections are marked are the same as those used in FIG. 3. Areas indicated by oblique lines are dielectric isolation areas 350 by which the circuit sections shown in FIG. 3 are separated from one another. Terminals on an outer frame indicate power supply pads and terminals corresponding to the middle points of the U, V, and W phases of the inverter circuit.

To prevent voltage variations in each of the circuit sections 210, 220, 230, 240, 250, 260, and 270 shown in FIG. 3 from spreading into adjacent circuit formation areas, the dielectric isolation areas 350 are formed so that they will not be touching one another. In the circuit formation areas (circuit sections 220, 240, and 250) except the circuit sections including level shifters (indicated by LS in FIG. 4), reference potential wirings are directly connected to power supply pads. These wirings are independent of one another and each of them is not shared by two or more areas. A signal outputted from each of these circuit sections is always inputted to a circuit section at the next stage which is separated by the dielectric isolation areas 350 via a circuit section including level shifters. This perfectly prevents noise from flowing from the ground.

In FIG. 4, three circuit sections 250 the reference potential of which are GNDH are included and three GNDH terminals or power supply pads are located. A wiring is connected to each terminal and voltage is supplied to the three circuit sections 250. Another method may be used. For example, three wirings may be connected to one terminal or power supply pad to supply the reference potential to the three circuit sections 250.

The reference potential of each circuit section including level shifters must equal to that of a circuit section to which a signal is inputted from it. Therefore, the same wiring is used for supplying reference potential to each circuit section including level shifters and a circuit section to which a signal is inputted from it.

In addition, each circuit section can be formed in an area separated from other areas by dielectrics, so a circuit section corresponding to a necessary function can be formed on the integrated circuit chip. As a result, the function of the PDU can easily be enhanced.

Figure 5:
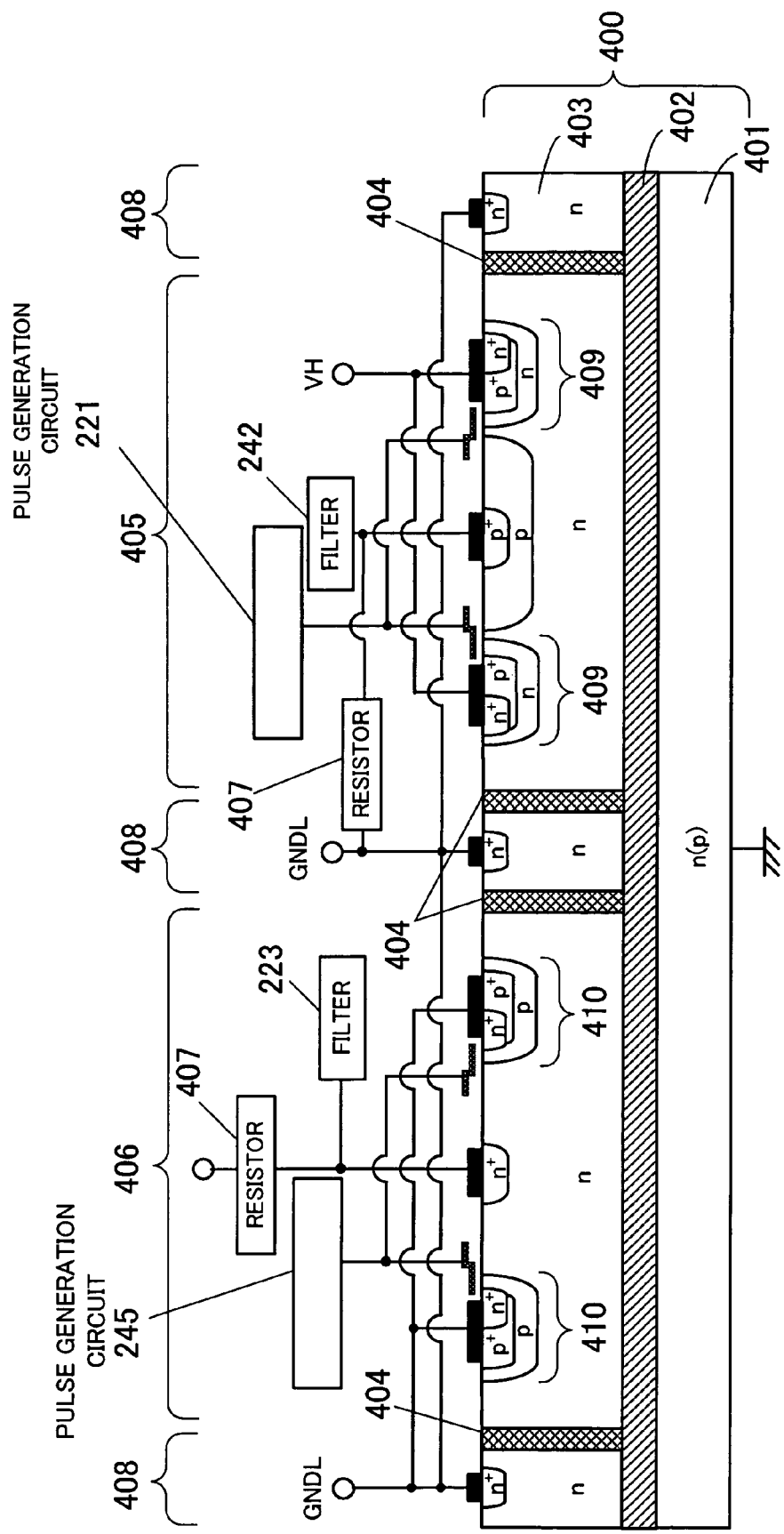
FIG. 5 is a sectional view showing two level shifters formed on the SOI substrate.

FIG. 5 is a sectional view showing two level shifters formed on the SOI substrate.

In FIG. 5, the two level shifters 231 and 232 shown in FIG. 3 are formed with the dielectric isolation areas 350 between.

In FIG. 5, each "n" indicates an n-type semiconductor layer and each "p" indicates a p-type semiconductor layer. An SOI substrate 400 is formed by adhering a semiconductor substrate 403 to an n- or p-type semiconductor substrate 401 with an oxide film ($SiO_2$) 402 between. Devices are formed on the semiconductor substrate 403. An n-type semiconductor layer is formed in the semiconductor substrate 403 where the circuits shown in FIG. 4 are to be formed. A conduction type should be selected according to device design.

The semiconductor substrate 403 where the devices are to be formed is divided into circuit formation areas by dielectric isolation trenches 404 (corresponding to the dielectric isolation areas 350). A horizontal high breakdown voltage p-channel MOSFET is formed in a circuit formation area 405 as the level shifter 232 and a horizontal n-channel MOSFET is formed in a circuit formation area 406 as the level shifter 231. Only one device is formed in each of the circuit formation areas separated by dielectrics. The circuit units (the pulse generation circuits 221 and 245 and the filters 223 and 242) and the power supply terminals (GNDL and VH) shown in FIG. 3 are connected to terminals of these devices.

If many devices included in a circuit section are all driven at 15V or less, then the circuit section can be formed in one area separated from other areas by dielectrics.

In FIG. 5, resistors 407 necessary to the level shifters are shown. The resistors 407 are actually made of polycrystalline silicon, so the resistors 407 themselves should be formed in a space in a chip area. Accordingly, there is no need to form areas which are separated from other areas by dielectrics and in which the resistors 407 are to be made.

In FIG. 5, an area 408 the potential of which is fixed at GNDL is formed between the adjacent circuit formation areas. In addition, a diffusion layer the potential of which is fixed at the reference potential of a device is located in an outer portion of each circuit formation area. That is to say, source and gate regions 409 connected to VH which is the reference potential of the device are located in an outer portion of the circuit formation area 405 in which the p-channel MOSFET is formed. Source and gate regions 410 connected to GNDL which is the reference potential of the device are located in an outer portion of the circuit formation area 406 in which the n-channel MOSFET is formed.

Figure 6:
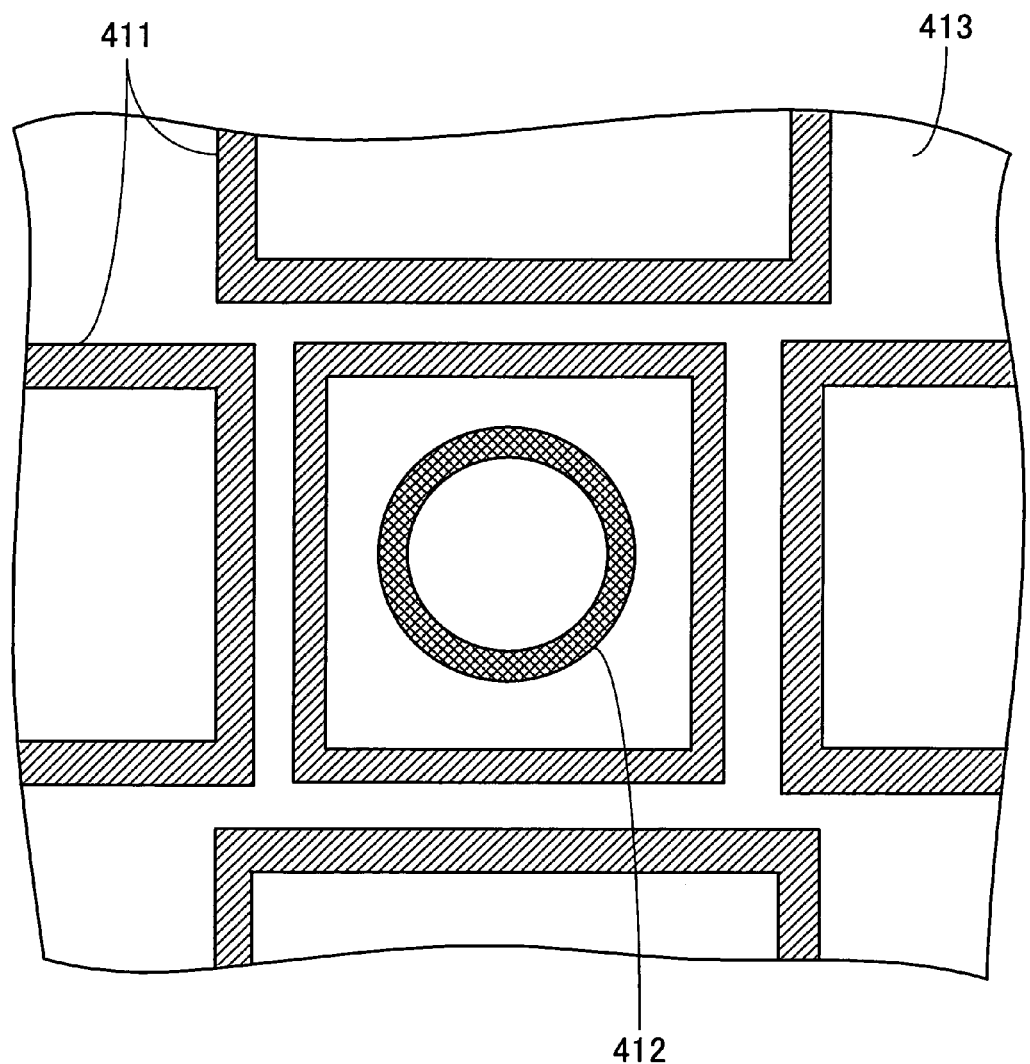
FIG. 6 is a plan view showing areas separated from one another by dielectrics.
Figure 7:
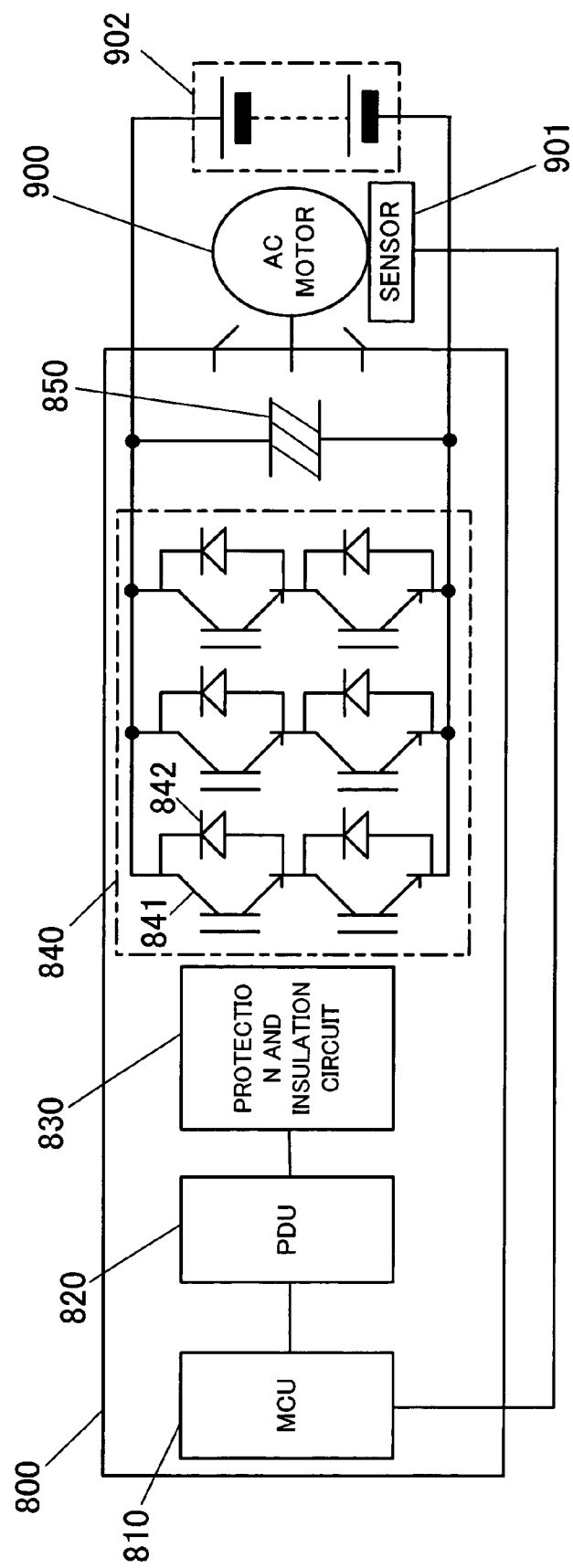
FIG. 7 shows an inverter unit used in a conventional HEV.

FIG. 6 is a plan view showing areas separated from one another by dielectrics.

In FIG. 6, deposition layers, such as electrodes and a surface oxide film, which are formed on and over the surface of the semiconductor substrate are omitted.

Each outer diffusion area shown in FIG. 5 completely closes an outermost portion of a circuit formation area on the surface of the semiconductor substrate. That is to say, as shown in FIG. 6, an outermost portion and an inner portion of a circuit formation area enclosed by a dielectric isolation area 411 are separated by a diffusion layer 412. An area 413 between dielectric isolation areas 411 corresponds to the area 408 shown in FIG. 5. The potential of the area 413 is fixed at GNDL and a circuit block has not been formed in the area 413 yet.

As stated above, by locating the diffusion layer 412 fixed at the reference potential of a device in the outer portion of the circuit formation area, voltage variations in an area outside the circuit formation area caused by voltage variations in the circuit formation area can be reduced.

When two or more circuit formation areas separated from one another by dielectrics are formed on the surface of the semiconductor substrate, the occurrence or inflow of noise between adjacent circuit formation areas can be prevented by forming an area fixed at arbitrary reference potential between them. This increases noise resistance.

In FIG. 6, the corner portions of the dielectric isolation areas 411 form right angles, but they may be in the shape of an arc. In FIG. 6, the shape of the diffusion layer 412 is a circle. However, there is no limit to the shape of the diffusion layer 412 as long as it is closed. Furthermore, the diffusion layer 412 may be touching the dielectric isolation area 411 in circuit formation area.

The area 408 in FIG. 5 and the area 413 in FIG. 6 where a circuit block has not been formed yet should be fixed at arbitrary potential.

As has been described in the foregoing, according to the embodiment of the present invention a miniaturizable, low-cost highly reliable inverter unit for HEVs having excellent functions and temperature characteristics is provided.

As a result, a miniaturizable, low-cost highly reliable vehicle drive apparatus in which the above inverter unit is used for controlling and driving an AC motor and which has excellent functions and cooling performance can be realized.

In the present invention, the first circuit section for controlling operating timing of the plurality of high breakdown voltage semiconductor elements included in the inverter circuit section and the second circuit section for outputting drive signals for driving the plurality of high breakdown voltage semiconductor elements according to the operating timing and for feeding back an abnormality of the inverter circuit section to the first circuit section are formed on the SOI substrate as one integrated circuit chip. Therefore, the miniature light inverter unit can be realized.

Furthermore, on the integrated circuit chip, the reference potentials of the circuit formation areas separated from one another by the dielectrics can be made independent of one another.

In addition, the reference potential of each of the circuit formation areas separated from one another is directly supplied by a wiring from a pad or a terminal for supplying reference potential. Wirings for supplying reference potential are not shared by a plurality of circuit formation areas and are independent of one another. Accordingly, variations in reference potential can be restricted within a circuit formation area.

Moreover, the level shifters are used for transmitting signals exchanged between circuit formation areas separated from each other by the dielectrics. This prevents noise produced in a circuit formation area from flowing into adjacent circuit formation areas and secures safe operation. Moreover, photocouplers are not used, so it is expected that the low-cost highly reliable inverter unit will be realized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An inverter unit for controlling an AC motor, the unit comprising:
    an inverter circuit section including a plurality of high breakdown voltage semiconductor elements;
    an integrated circuit chip including a first circuit section for controlling operating timing of the plurality of high breakdown voltage semiconductor elements and a second circuit section for outputting drive signals for driving the plurality of high breakdown voltage semiconductor elements according to the operating timing and for feeding back an abnormality of the inverter circuit section to the first circuit section formed on an SOI substrate;
    a level shifter provided between circuit formation areas; and
    a pulse generation circuit that converts a signal received from a circuit formation area to which a first power supply voltage is applied, into a one-shot pulse of a reference voltage that is different from a reference voltage of the signal, and inputs the one-shot pulse to the level shifter provided on a path that carries the signal from the circuit formation area to a circuit formation area to which a second power supply voltage higher than the first power voltage is applied, and
    wherein the circuit formation areas which differ in reference potential are separated from one another by dielectrics, and
    the dielectrics are separated from one another and surround the respective circuit formation areas.

2. The inverter unit according to claim 1, wherein:
    reference potential of each of the circuit formation areas are separated from one another is directly supplied by a wiring from a pad or a terminal for supplying the reference potential; and
    wirings for supplying the reference potential are not shared by the circuit formation areas and are independent of one another.

3. The inverter unit according to claim 1, wherein if the circuit formation areas separated from one another are formed on a flat surface, areas fixed at predetermined reference potential are formed between adjacent circuit formation areas.

4. The inverter unit according to claim 1, wherein:
    a diffusion layer to which reference potential is applied is located in an outer portion of each of the circuit formation areas separated from one another; and
    an inner portion of each of the circuit formation areas is enclosed by the diffusion layer.

5. The inverter unit according to claim 1, wherein the inverter circuit section and the integrated circuit chip are incorporated into one module.

6. An integrated circuit chip for driving an inverter circuit including a plurality of high breakdown voltage semiconductor elements, the chip comprising:
    a first circuit section for controlling operating timing of the plurality of high breakdown voltage semiconductor elements;
    a second circuit section for outputting drive signals for driving the plurality of high breakdown voltage semiconductor elements according to the operating timing and for feeding back an abnormality of the inverter circuit to the first circuit section;

a level shifter provided between circuit formation areas; and a pulse generation circuit that converts a signal received from a circuit formation area to which a first power supply voltage is applied, into a one-shot pulse of a reference voltage that is different from a reference voltage of the signal, and inputs the one-shot pulse to the level shifter provided on a path that carries the signal from the circuit formation area to a circuit formation area to which a second power supply voltage higher than the first power voltage is applied, and wherein the first circuit section and the second circuit section are formed on an SOI substrate, wherein the circuit formation areas which differ in reference potential are separated from one another by dielectrics, and wherein the dielectrics are separated from one another and surround the respective circuit formation areas.

7. The integrated circuit chip according to claim 6, wherein:

reference potential of each of the circuit formation areas separated from one another is directly supplied by a wiring from a pad or a terminal for supplying the reference potential; and wirings for supplying the reference potential are not shared by the circuit formation areas and are independent of one another.

8. The integrated circuit chip according to claim 6, wherein if the circuit formation areas separated from one another are formed on a flat surface, areas fixed at predetermined reference potential are formed between adjacent circuit formation areas.

9. The integrated circuit chip according to claim 6, wherein a diffusion layer to which reference potential is applied is located in an outer portion of each of the circuit formation areas separated from one another, and an inner portion of each of the circuit formation areas is enclosed by a diffusion layer.

* * * * *